(12) United States Patent
Kwak et al.

(10) Patent No.: US 8,874,263 B2
(45) Date of Patent: Oct. 28, 2014

(54) WALKING ROBOT AND CONTROL METHOD THEREOF

(75) Inventors: Ho Seong Kwak, Seoul (KR); Kyung Shik Roh, Seongnam-si (KR); Woong Kwon, Seongnam-si (KR); Min Hyung Lee, Anyang-si (KR); Joo Hyung Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 410 days.

(21) Appl. No.: 13/249,950

(22) Filed: Sep. 30, 2011

(65) Prior Publication Data

US 2012/0083922 A1    Apr. 5, 2012

(30) Foreign Application Priority Data

Oct. 5, 2010 (KR) .................. 10-2010-0097064

(51) Int. Cl.
*B25J 11/00* (2006.01)
*B62D 57/032* (2006.01)

(52) U.S. Cl.
CPC ............. *B62D 57/032* (2013.01); *Y10S 901/01* (2013.01)
USPC ............... 700/245; 700/261; 700/254; 901/1; 318/568.11; 318/568.12

(58) Field of Classification Search
CPC .................................................. B62D 57/032
USPC ........ 700/245, 254, 261; 318/568.11, 568.12, 318/568.16; 901/1, 46
See application file for complete search history.

(56) References Cited

U.S. PATENT DOCUMENTS

| | | | | |
|---|---|---|---|---|
| 5,355,064 A * | 10/1994 | Yoshino et al. | .......... | 318/568.12 |
| 7,053,579 B2 * | 5/2006 | Moridaira | ................ | 318/568.12 |
| 8,498,742 B2 * | 7/2013 | Kwak et al. | .................... | 700/245 |
| 8,498,743 B2 * | 7/2013 | Kwak et al. | .................... | 700/245 |
| 2005/0113973 A1 * | 5/2005 | Endo et al. | ..................... | 700/245 |
| 2007/0016329 A1 * | 1/2007 | Herr et al. | ...................... | 700/250 |
| 2007/0260355 A1 * | 11/2007 | Morimoto et al. | ............ | 700/245 |
| 2010/0161116 A1 * | 6/2010 | Kwak et al. | .................... | 700/245 |
| 2010/0161117 A1 * | 6/2010 | Kwak et al. | .................... | 700/245 |
| 2011/0172824 A1 * | 7/2011 | Park et al. | ...................... | 700/261 |
| 2011/0172825 A1 * | 7/2011 | Lee et al. | ....................... | 700/261 |
| 2011/0178636 A1 * | 7/2011 | Kwon | .......................... | 700/253 |
| 2012/0083922 A1 * | 4/2012 | Kwak et al. | .................... | 700/245 |
| 2012/0143376 A1 * | 6/2012 | Seo | ............................... | 700/261 |
| 2012/0155775 A1 * | 6/2012 | Ahn et al. | ..................... | 382/195 |

(Continued)

*Primary Examiner* — Thomas G Black
*Assistant Examiner* — Wae Louie
(74) *Attorney, Agent, or Firm* — Staas & Halsey LLP

(57) ABSTRACT

A walking robot and a control method in which conversion between walking servo control methods is stably carried out. The walking robot includes a sensor unit to measure angles and torques of joints, and a control unit to calculate voltages applied in a Finite State Machine (FSM) control mode and a Zero Moment Point (ZMP) control mode according to the angles and torques of the joints to drive respective joint motors, to store last target joint angles in the FSM control mode during conversion from the FSM control mode to the ZMP control mode, and to perform a motion based on the FSM control mode by substituting the last target joint angles in the FSM control mode for target joint angles in the FSM control mode during conversion from the ZMP control mode to the FSM control mode, thereby performing stable conversion between walking servo control modes without joint sagging.

15 Claims, 8 Drawing Sheets

(56) References Cited

U.S. PATENT DOCUMENTS

| | | | |
|---|---|---|---|
| 2012/0158175 A1* | 6/2012 | Lee et al. | 700/246 |
| 2012/0158181 A1* | 6/2012 | Seo | 700/261 |
| 2012/0158182 A1* | 6/2012 | Lee et al. | 700/261 |
| 2012/0158183 A1* | 6/2012 | Lim et al. | 700/261 |
| 2013/0116820 A1* | 5/2013 | Lee et al. | 700/254 |
| 2013/0144439 A1* | 6/2013 | Lee et al. | 700/261 |

* cited by examiner

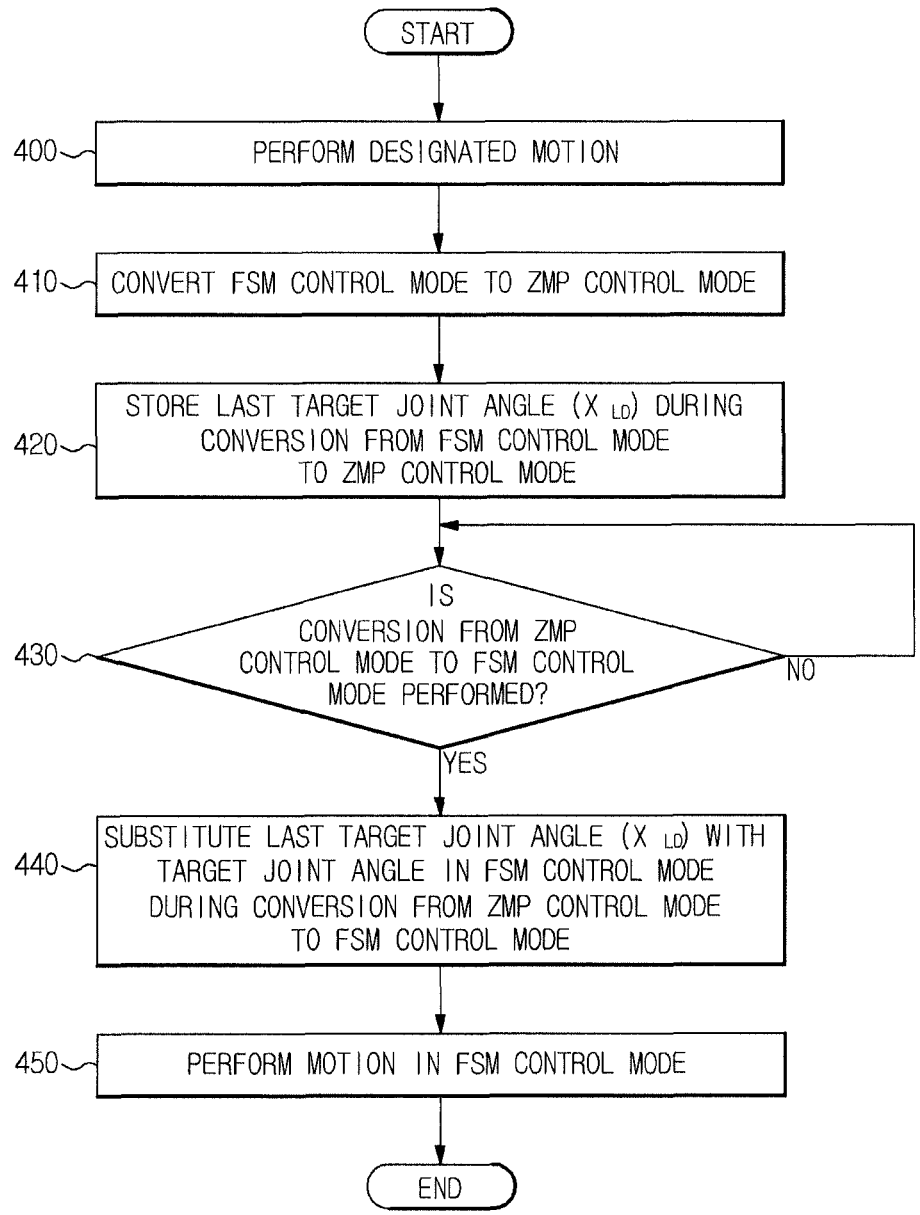

WALKING ROBOT AND CONTROL METHOD THEREOF

CROSS-REFERENCE TO RELATED APPLICATIONS

This application claims the benefit of Korean Patent Application No. 2010-0097064, filed on Oct. 5, 2010 in the Korean Intellectual Property Office, the disclosure of which is incorporated herein by reference.

BACKGROUND

1. Field

Embodiments relate to a walking robot which walks using a plurality of legs and a control method thereof.

2. Description of the Related Art

Robots are machines which perform a motion similar to that of humans. Initial robots were industrial robots, such as manipulators or transfer robots for the purposes of automation and unmanned operation. Recently, research and development of walking robots which mimic bipedal walking of humans has progressed. Bipedal walking is disadvantageous in that it is unstable and is difficult in terms of pose control and walking control compared with tripedal walking or hexapedal walking, but is advantageous in that it more flexibly copes with the uneven ground or discontinuous surfaces.

Control of walking robots is generally divided into a position-based Zero Moment Point (ZMP) control method and a torque-based Finite State Machine (FSM) control method.

In the ZMP control method, a walking direction, a walking stride, and a walking velocity of a walking robot are set in advance, walking patterns of respective legs corresponding to the set factors are generated, and walking trajectories of the respective legs are calculated based on the walking patterns. Further, in case of a bipedal walking robot, target control values of motors of respective joints are calculated through calculation of inverse Kinematics of the calculated walking trajectories. Further, servo control in which the respective legs trace the calculated walking trajectories is carried out. Therefore, it is detected whether or not positions of the respective legs precisely trace the walking trajectories based on the walking patterns during walking, and if the respective legs deviate from the walking trajectories, torques of motors are adjusted so that the respective legs precisely trace the walking trajectories. On the other hand, in the FSM control method, FSMs and states of respective motions of a walking robot are defined in advance, and the robot is controlled so as to properly walk according to the respective states of the motions during walking.

The ZMP control method is a position-based control method and thus achieves precise position control, but requires a high servo gain, thereby having low energy efficiency and high stiffness and resulting in a great impact applied to surrounding environments. The FSM control method achieves control through a torque command and is applied to an elastic mechanism and thus has high energy efficiency and low stiffness and is safe with respect to surrounding environments, but cannot perform precise position control and thus has difficulty in performing a precise whole body motion, such as stair ascent or obstacle avoidance.

Therefore, walking robots may be controlled through different walking servo control methods according to various conditions, such as walking environments, performance of the robots, etc., and require combination of various servo control methods. However, if conversion between the different servo control methods is not carefully performed, joints of the robot may sag due to a stiffness difference between the servo control methods, possibly resulting in hardware damage.

SUMMARY

Therefore, it is an aspect of an embodiment to provide a walking robot and a control method thereof in which conversion between walking servo control methods is stably carried out.

Additional aspects of embodiments will be set forth in part in the description which follows and, in part, will be obvious from the description, or may be learned by practice of the embodiment.

In accordance with an aspect of an embodiment, a control method of a walking robot, which enables conversion between a Finite State Machine (FSM) control mode and a Zero Moment Point (ZMP) control mode and is temporarily stopped during conversion between the control modes, includes storing last target joint angles in the FSM control mode during conversion from the FSM control mode to the ZMP control mode, and performing a motion based on the FSM control mode by substituting the last target joint angles in the FSM control mode with target joint angles in the FSM control mode during conversion from the ZMP control mode to the FSM control mode.

A temporarily stopped state of the robot during conversion from the FSM control mode to the ZMP control mode may be equal to a temporarily stopped state of the robot during conversion from the ZMP control mode to the FSM control mode.

During conversion from the FSM control mode to the ZMP control mode, a walking motion based on the ZMP control mode may be performed by substituting current joint angles in the FSM control mode with target joint angles in the ZMP control mode.

The storage of the last target joint angles in the FSM control mode during conversion from the FSM control mode to the ZMP control mode may include storing target joint angles at the last pose during conversion from the FSM control mode to the ZMP control mode.

The conversion from the FSM control mode to the ZMP control mode may be carried out when a motion requiring precise position control is performed, and the conversion from the ZMP control mode to the FSM control mode may be carried out when a motion requiring simple control is performed.

In the ZMP control mode, voltages input to joint motors may be calculated using angle data of respective joints and a PID control equation, and be then applied to the joint motors to drive the joint motors.

In the FSM control mode, torques may be calculated using angle data of respective joints and a PID control equation, and voltages applied to joint motors may be calculated using the torques and be then applied to the joint motors to drive the joint motors.

In accordance with another aspect of an embodiment, a walking robot includes a sensor unit to measure angles and torques of joints, and a control unit to calculate voltages applied in a Finite State Machine (FSM) control mode and a Zero Moment Point (ZMP) control mode according to the angles and torques of the joints to drive respective joint motors, to store last target joint angles in the FSM control mode during conversion from the FSM control mode to the ZMP control mode, and to perform a motion based on the FSM control mode by substituting the last target joint angles in the FSM control mode for target joint angles in the FSM control mode during conversion from the ZMP control mode to the FSM control mode.

The control unit may temporarily stop the walking robot during conversion between the FSM control mode and the ZMP control mode.

The control unit may substitute current joint angles in the FSM control mode with target joint angles in the ZMP control mode during conversion from the FSM control mode to the ZMP control mode.

The last target joint angles in the FSM control mode may be target joint angles in the FSM control mode at a point of time when the FSM control mode is converted to the ZMP control mode.

The control unit may carry out the conversion from the FSM control mode to the ZMP control mode when a motion requiring precise position control is performed, and carry out the conversion from the ZMP control mode to the FSM control mode when a motion requiring simple control is performed.

The control unit may include a mode switching unit to perform a switching motion between the ZMP control mode and the FSM control mode based on the current control mode of the walking robot, an external command, and a target motion.

The control unit may further include an FSM-ZMP conversion unit and a ZMP-FSM conversion unit, activated according to switching of the mode switching unit.

The control unit may include a database to store the last target joint angles in the FSM control mode.

BRIEF DESCRIPTION OF THE DRAWINGS

These and/or other aspects of embodiments will become apparent and more readily appreciated from the following description of the embodiments, taken in conjunction with the accompanying drawings of which:

FIG. 7 is a flow chart illustrating a mode conversion method of a walking robot in accordance with an embodiment.

DETAILED DESCRIPTION

Figure 1:
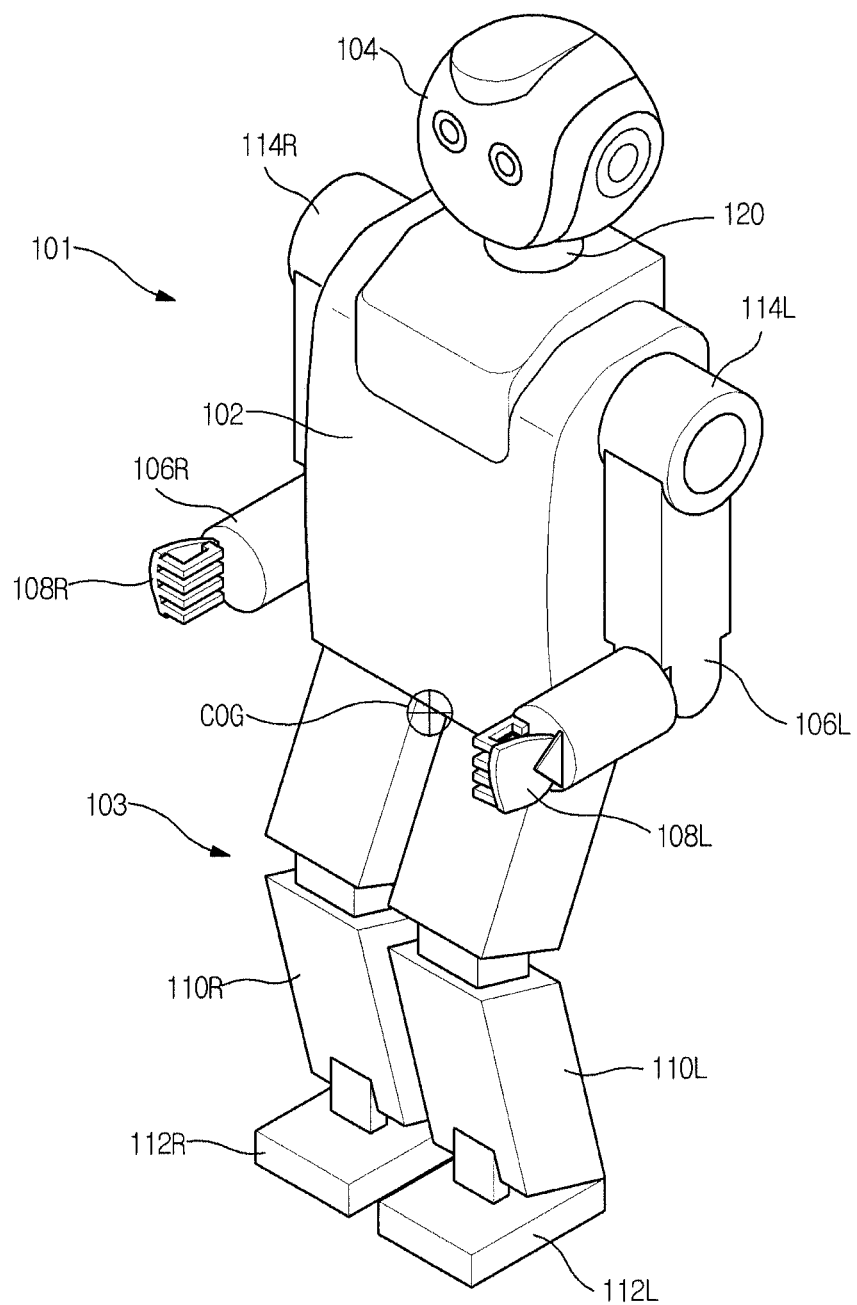
FIG. 1 is a view illustrating an external appearance of a walking robot in accordance with an embodiment.

Reference will now be made in detail to embodiments, examples of which are illustrated in the accompanying drawings, wherein like reference numerals refer to like elements throughout.

FIG. 1 is a view illustrating an external appearance of a robot in accordance with an embodiment.

As shown in FIG. 1, a robot 100 in accordance with an embodiment is a bipedal walking robot which walks upright using two legs 110 in the same manner as a human, and includes an upper body 101 including a torso 102, a head 104, and arms 106, and a lower body 103 including the two legs 110.

The upper body 101 of the robot 100 includes the torso 102, the head 104 connected to the upper portion of the torso 102 through a neck 120, the two arms 106L and 106R connected to both sides of the upper portion of the torso 102 through shoulders 114L and 114R, and hands 108L and 108R respectively connected to tips of the two arms 106L and 106R.

The lower body 103 of the robot 100 includes the two legs 110L and 110R connected to both sides of the lower portion of the torso 102 of the upper body 101, and feet 112L and 112R respectively connected to tips of the two legs 110L and 110R.

Here, "R" and "L" respectively indicate the right and left sides of the robot 100, and COG indicates the center of gravity of the robot 100.

Figure 2:
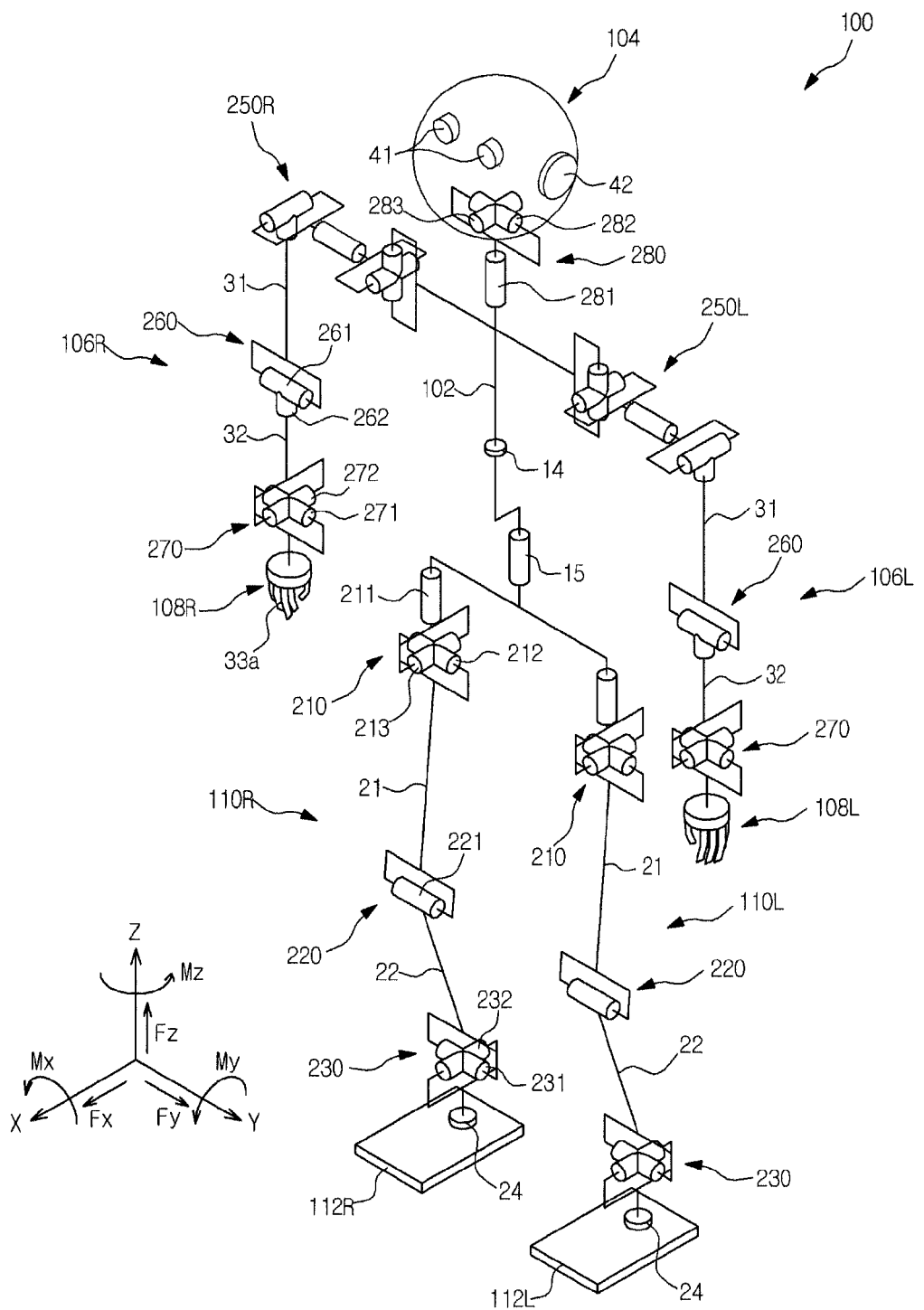
FIG. 2 is a view illustrating structures of main joints of the robot of FIG. 1.

FIG. 2 is a view illustrating structures of main joints of the robot of FIG. 1.

As shown in FIG. 2, a pose sensor 14 is installed on the torso 102 of the robot 100. The pose sensor 14 detects a tilt angle of the upper body 101, i.e., an inclination of the upper body 101 with respect to a vertical axis, and an angular velocity thereof, and then generates pose data. The pose sensor 14 may be installed on the head 104 as well as the torso 102.

A waist joint unit 15 having 1 degree of freedom in the yaw direction so as to rotate the upper body 101 is installed on the torso 102.

Further, cameras 41 to capture surrounding images and microphones 42 to input user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis), and a rotary joint 283 in the roll direction (rotated around the X-axis), and thus has 3 degrees of freedom.

Motors (for example, actuators, such as electric motors or hydraulic motors) to rotate the head 104 are connected to the respective rotary joints 281, 282, and 283 of the neck joint unit 280.

The two arms 106L and 106R of the robot 100 respectively include upper arm links 31, lower arm links 32, and the hands 108L and 108R.

The upper arm links 31 are connected to the upper body 101 through shoulder joint units 250L and 250R, the upper arm links 31 and the lower arm links 32 are connected to each other through elbow joint units 260, and the lower arm links 32 and the hands 108L and 108R are connected to each other by wrist joint units 270.

The shoulder joint units 250L and 250R are installed at both sides of the torso 102 of the upper body 101, and connect the two arms 106L and 106R to the torso 102 of the upper body 101.

Each elbow joint unit 260 has a rotary joint 261 in the pitch direction and a rotary joint 262 in the yaw direction, and thus has 2 degrees of freedom.

Each wrist joint unit 270 has a rotary joint 271 in the pitch direction and a rotary joint 272 in the roll direction, and thus has 2 degrees of freedom.

Each hand 108L or 108R is provided with five fingers 33a. A plurality of joints (not shown) driven by motors may be installed on the respective fingers 33a. The fingers 33a perform various motions, such as gripping of an article or pointing in a specific direction, in connection with movement of the arms 106.

The two legs 110L and 110R of the robot 100 respectively include thigh links 21, calf links 22, and the feet 112L and 112R.

The thigh links 21 correspond to thighs of a human and are connected to the torso 102 of the upper body 101 through hip joint units 210, the thigh links 21 and the calf links 22 are connected to each other by knee joint units 220, and the calf links 22 and the feet 112L and 112R are connected to each other by ankle joint units 230.

Each hip joint unit 210 has a rotary joint (hip yaw joint) 211 in the yaw direction (rotated around the Z-axis), a rotary joint (hip pitch joint) 212 in the pitch direction (rotated around the Y-axis), and a rotary joint (hip roll joint) 213 in the roll direction (rotated around the X-axis), and thus has 3 degrees of freedom.

Each knee joint unit 220 has a rotary joint 221 in the pitch direction, and thus has 1 degree of freedom.

Each ankle joint unit 230 has a rotary joint 231 in the pitch direction and a rotary joint 232 in the roll direction, and thus has 2 degrees of freedom.

Since six rotary joints of the hip joint unit 210, the knee joint unit 220, and the ankle joint unit 230 are provided on each of the two legs 110L and 110R, a total of twelve rotary joints is provided to the two legs 110L and 110R.

Further, multi-axis force and torque (F/T) sensors 24 are respectively installed between the feet 112L and 112R and the ankle joint units 230 of the two legs 110L and 110R. The multi-axis F/T sensors 24 measure three-directional components Fx, Fy, and Fz of force and three-directional components Mx, My, and Mz of moment transmitted from the feet 112L and 112R, thereby detecting whether or not the feet 112L and 112R touch the ground and load applied to the feet 112L and 112R.

Although not shown in the drawings, actuators, such as motors, to drive the respective rotary joints are installed on the robot 100. A control unit to control the overall operation of the robot 100 properly controls the motors, thereby allowing the robot 100 to perform various motions.

Figure 3:
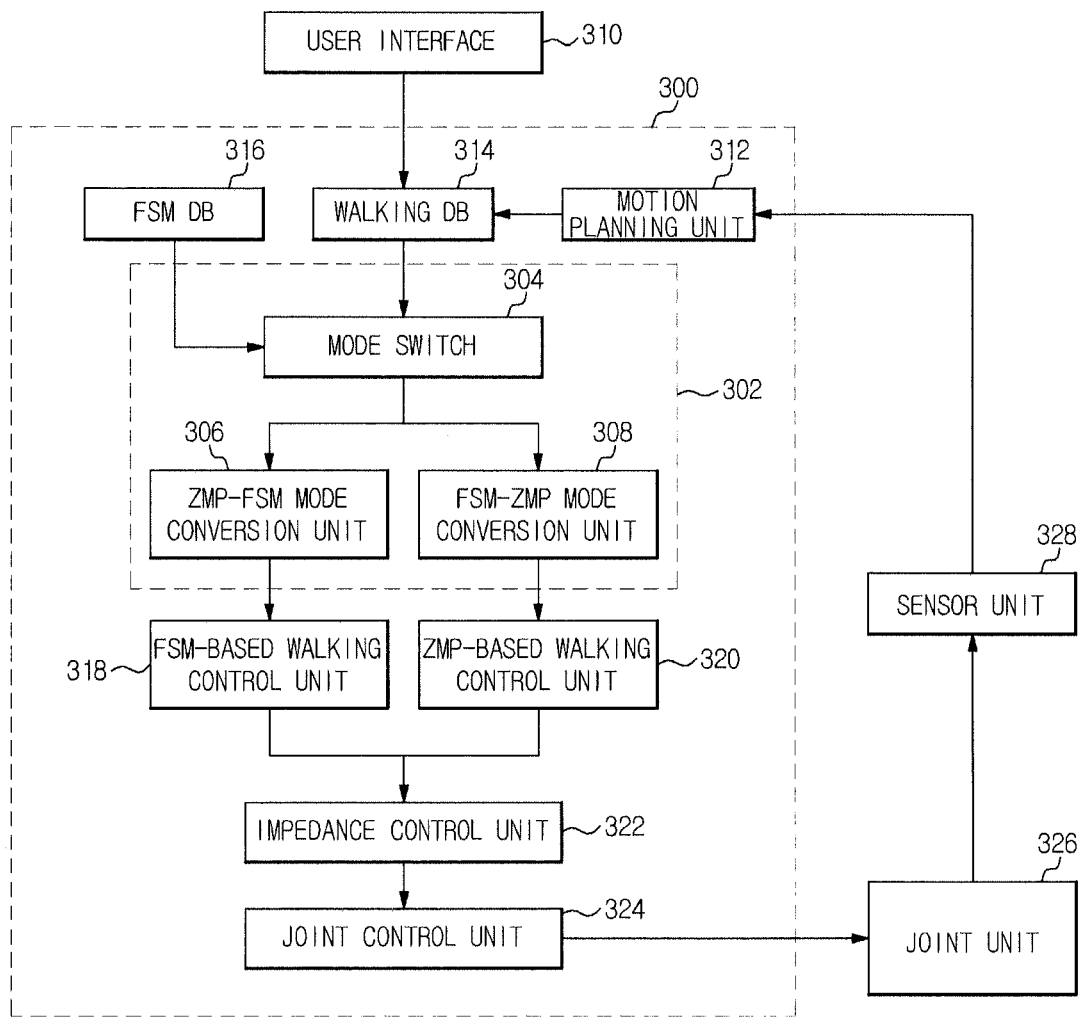
FIG. 3 is a block diagram illustrating a control system of the walking robot in accordance with an embodiment.

FIG. 3 is a block diagram illustrating a control system of the walking robot in accordance with an embodiment. As shown in FIG. 3, the control unit 300 fundamentally controls walking of the robot 100, and selects one from among the FSM control mode and the ZMP control mode according to walking conditions of the robot 100 (i.e., whether or not a surface on which the robot 100 walks is even and whether or not an obstacle is present, etc.). The FSM control mode is a torque-based walking control mode, and the ZMP control mode is a position-based walking control mode.

The control unit 300 selects the FSM control mode to control walking on the even terrain or relatively simple walking, and performs walking control based on the FSM control mode. The control unit 300 selects the ZMP control mode if a stride needs to be designated due to non-even terrain, such as a staircase, or an obstacle or if control of a precise whole body operation, such as opening of a door, is required, and performs walking control based on the ZMP control mode.

In the ZMP control mode, moments in the roll and pitch directions are controlled to be "0" on a contact surface of the robot 100 with the ground. In the ZMP control mode, a pose of the robot 100 is maintained based on the fact that the robot 100 will not fall over when the ZMP is located within a support polygon of the robot 100. In the ZMP control mode, in order to locate the ZMP of the robot 100 within the support polygon of the robot 100, respective joints of the robot 100 need to precisely maintain desired angles, and thereby the joints require high stiffness. In the ZMP control mode, joint angle sensors (for example, encoders) are used to maintain the desired angles of the respective joints. As one example of position control using joint angle sensors, there is PID control. A PID control equation is as follows.

$$V = K_p^p(x_d - x) + K_d^p \frac{(x_d - x)}{dt} + K_i^p \int (x_d - x) dt \qquad \text{Equation 1}$$

Here, V represents a voltage input to each joint motor, $K_p^p$ represents a proportional (p) gain in PID control, $K_d^p$ represents a differential (d) gain in PID control, $K_i^p$ represents an integral (i) gain in PID control, $x_d$ represents a target angle of each joint, x represents an actual angle of each joint, and df represents a sampling time.

The control unit 300 calculates an input voltage V of each joint motor using Equation 1 above, and thus performs position control.

In the FSM control mode, walking of the robot is controlled using a Finite State Machine (FSM). In the FSM control mode, a plurality of operating states is defined in advance (Finite State), target torques of respective joints are calculated with reference to the respective operating states during walking, and the joints are controlled so as to trace the target torques. That is, the FSM control mode is a torque-based control mode in which target torques are given so as to perform motions defined in advance and the joints are controlled to trace the target torques. The target torques are calculated through the PID control equation using joint angle sensors. A torque calculation equation based on the PID control equation using joint angle sensors is as follows.

$$tau_d = K_p(x_d - x) + K_d \frac{(x_d - x)}{dt} + K_i \int (x_d - x) dt \qquad \text{Equation 2}$$

Here, $tau_d$ represents a target torque, $K_p$ represents a p gain in the PID control equation, $K_d$ represents a d gain in the PID control equation, $K_i$ represents an i gain in the PID control equation, $x_d$ represents a target angle of each joint, x represents an actual angle of each joint, and df represents a sampling time.

When the target torque is calculated using Equation 2 above, the control unit 300 calculates a voltage applied to each joint motor through Equation 3 below using the target torque and an actual torque of each joint measured by a torque sensor (not shown).

$$V = K_p^t(tau_d - tau) + K_d^t \frac{(tau_d - tau)}{dt} + K_i^t \int (tau_d - tau) dt \qquad \text{Equation 3}$$

Here, V represents a voltage input to each joint motor, $K_p^t$ represents a p gain in the PID control equation, $K_d^t$ represents a d gain in the PID control equation, $K_i^t$ represents an i gain in the PID control equation, $tau_d$ represents a target torque, tau represents is an actual torque, and df represents a sampling time.

A mode set unit 302 of the control unit 300 includes a mode switching unit 304, a ZMP-FSM mode conversion unit 306, and an FSM-ZMP mode conversion unit 308. The mode switching unit 304 activates one of the ZMP-FSM mode conversion unit 306 and the FSM-ZMP mode conversion unit 308 based on the current control mode (the FSM control mode or the ZMP control mode) of the robot 100, a user command input from the outside through a user interface 310, and a target motion of the robot 100 input through a motion planning unit 312, thereby perform conversion between the walking control modes of the robot 100. Further, during the conversion between the walking control modes of the robot 100, the mode switching unit 304 refers to walking control data from a walking database 314, FSM control data from an FSM database 316, force applied to soles of feet measured by a sensor unit 328, torques of the respective joints, a pose of the torso, visual data, and audio data.

The ZMP-FSM mode conversion unit 306 converts the walking control mode of the robot 100 from the ZMP control mode to the FSM control mode. When the control mode of the robot 100 is converted to the FSM control mode, the robot 100 is controlled in the FSM control mode by an FSM-based walking control unit 318.

The FSM-ZMP mode conversion unit 308 converts the walking control mode of the robot 100 from the FSM control mode to the ZMP control mode. When the control mode of the robot 100 is converted to the ZMP control mode, the robot 100 is controlled in the ZMP control mode by a ZMP-based walking control unit 320.

Control of the robot 100 is carried out through impedance control (stiffness control) of the respective joints by an impedance control unit 322 and torque/position control of the respective joint units 326 (including all joint units shown in FIG. 2) by a joint control unit 324.

The sensor unit 328 includes torque sensors measuring torques of the respective joint units 326, and joint angle sensors measuring angles of the respective joint units 326.

Hereinafter, a conversion method between an unknown value in the control mode prior to conversion and an unknown value in the control mode after conversion, i.e., a conversion method between unknown values of joint angles, during conversion between the FSM control mode and the ZMP control mode will be described in detail with reference to the accompanying drawings.

Figure 4A:
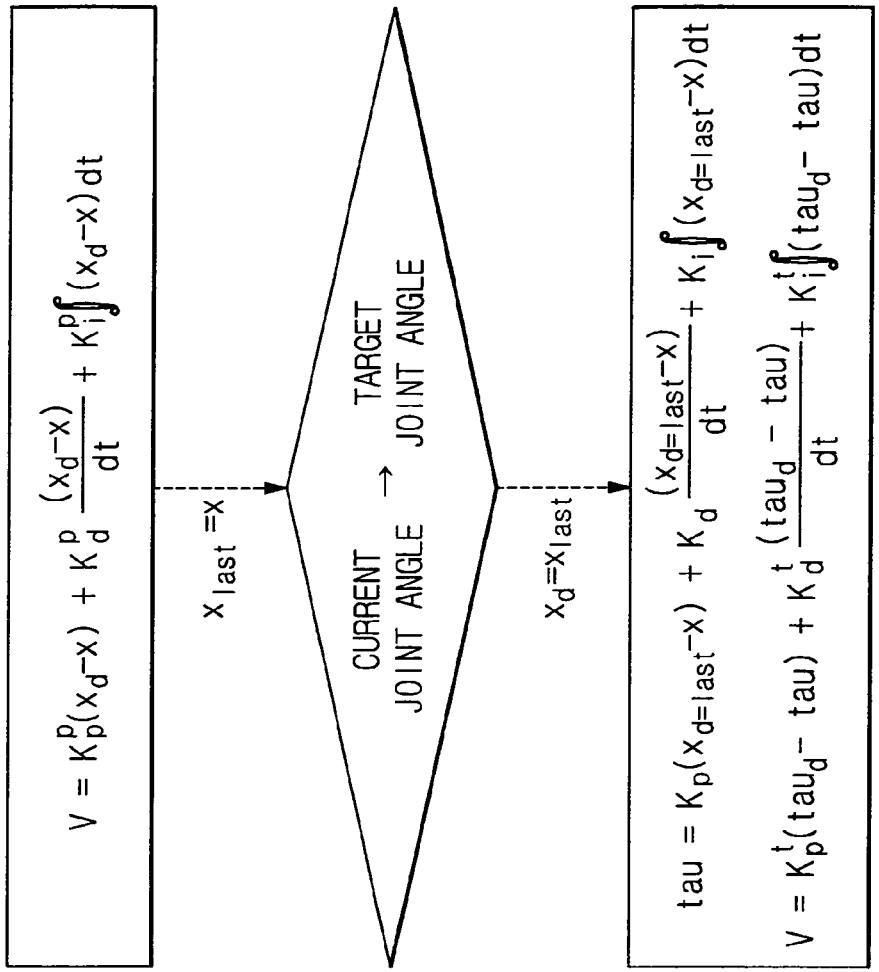
FIGS. 4A and 4B are views illustrating general methods of setting a target angle during conversion between an FSM control mode and a ZMP control mode.
Figure 4B:
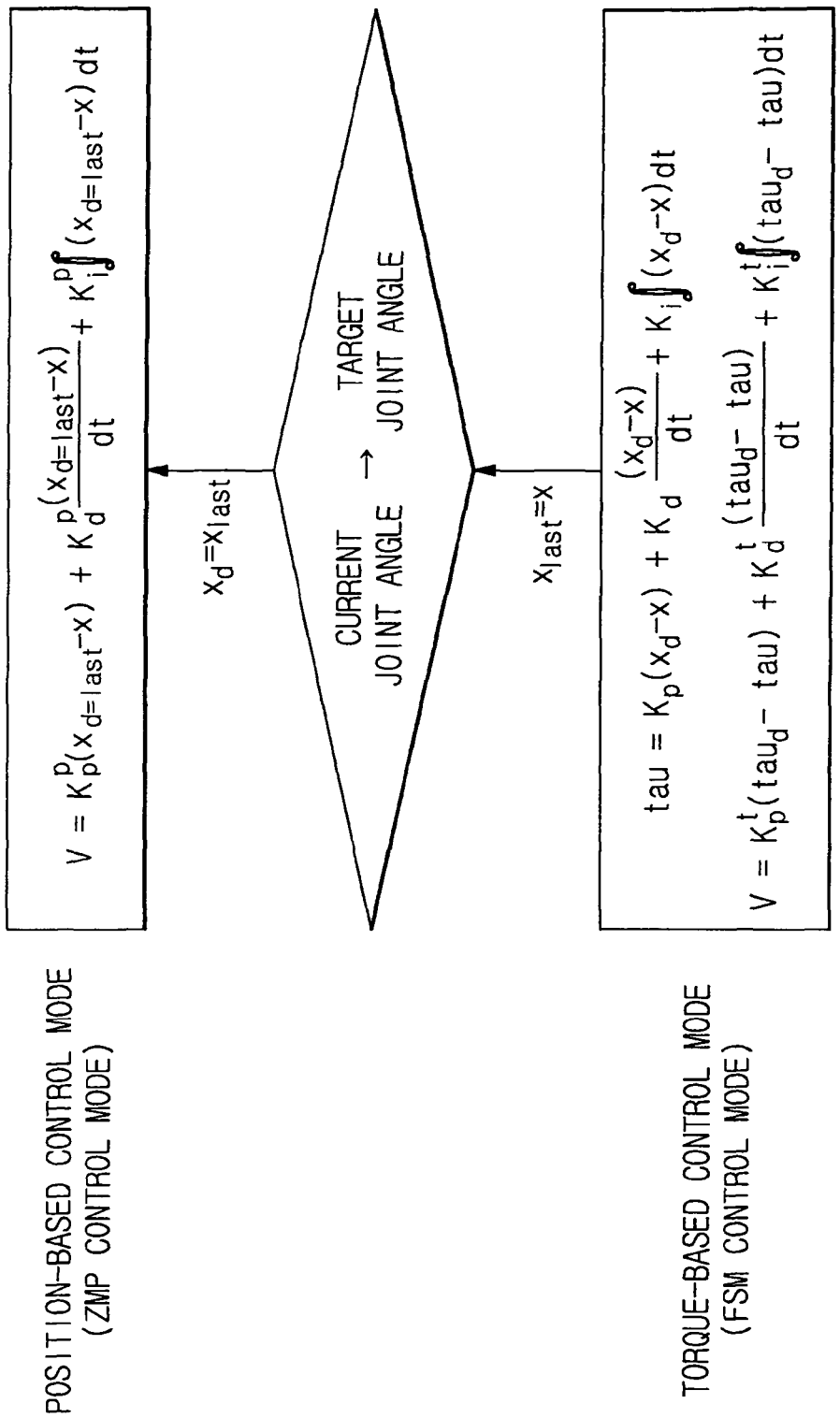

FIGS. 4A and 4B are views illustrating general methods of setting target angles during conversion between the FSM control mode and the ZMP control mode.

With reference to FIG. 4A, when the ZMP control mode is converted to the FSM control mode, the current joint angle x in the ZMP control mode is converted to the target joint angle $x_d$ in the FSM control mode.

When the current joint angle x in the ZMP control mode is converted to the target joint angle $x_d$ in the FSM control mode during conversion from the ZMP control mode to the FSM control mode, joint stiffness is converted from a large value to a small value, and thus the joint may suddenly sag, thereby suddenly increasing current/voltage and thus possibly resulting in hardware damage.

With reference to FIG. 4B, when the FSM control mode is converted to the ZMP control mode, the current joint angle x in the FSM control mode is converted to the target joint angle $x_d$ in the ZMP control mode.

Conversion of the current joint angle x in the FSM control mode to the target angle $x_d$ in the ZMP control mode during conversion from the FSM control mode (mode having low stiffness) to the ZMP control mode (mode having high stiffness) does not cause any performance problem. The reason is that conversion from the FSM control mode having a relatively low stiffness to the ZMP control mode having a relatively high stiffness requires greater current/voltage value and thus hardware damage due to overcurrent/overvoltage is not caused.

As described above, when the ZMP control mode is converted to the FSM control mode, joint sagging occurs due to conversion of the current joint angle x in the ZMP control mode to the target angle $x_d$ in the FSM control mode, thus possibly resulting in hardware damage. Therefore, in order to prevent hardware damage due to joint sagging, a value corresponding to a sagging amount of the joint needs to be added to the target joint angle. That is, instead of substitution of the target joint angle in the FSM control mode for the current joint angle in the ZMP control mode, the target joint angle in the FSM control mode is set to an angle obtained by adding a designated value α to the current joint angle in the ZMP control mode.

Hereinafter, a method of calculating the designated value α added to the current joint angle in the ZMP control mode during conversion from the ZMP control mode to the FSM control mode will be described.

Figure 5:
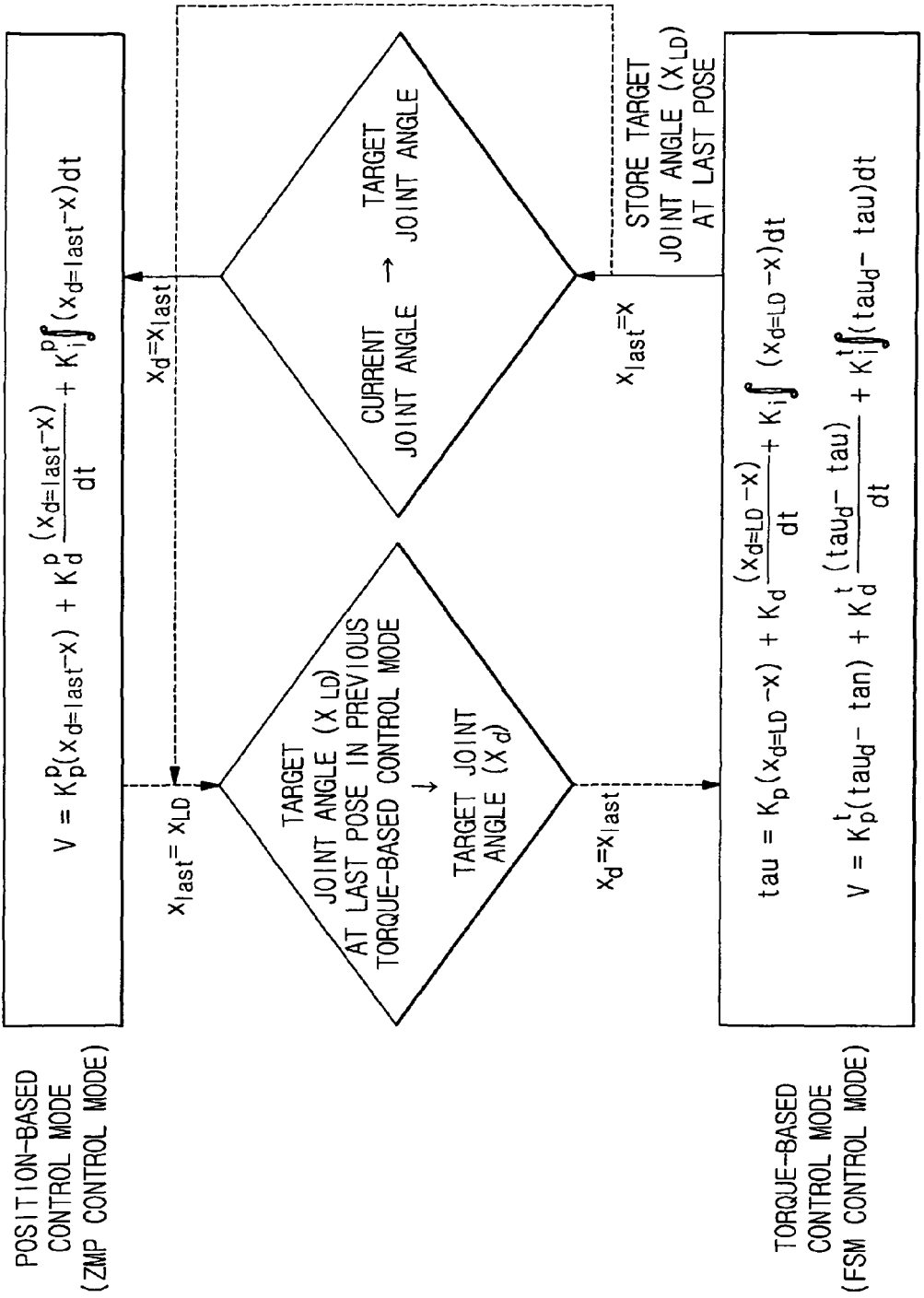
FIG. 5 is a view illustrating a mode conversion method between the FSM control mode and the ZMP control mode of the walking robot in accordance with an embodiment.
Figure 6:
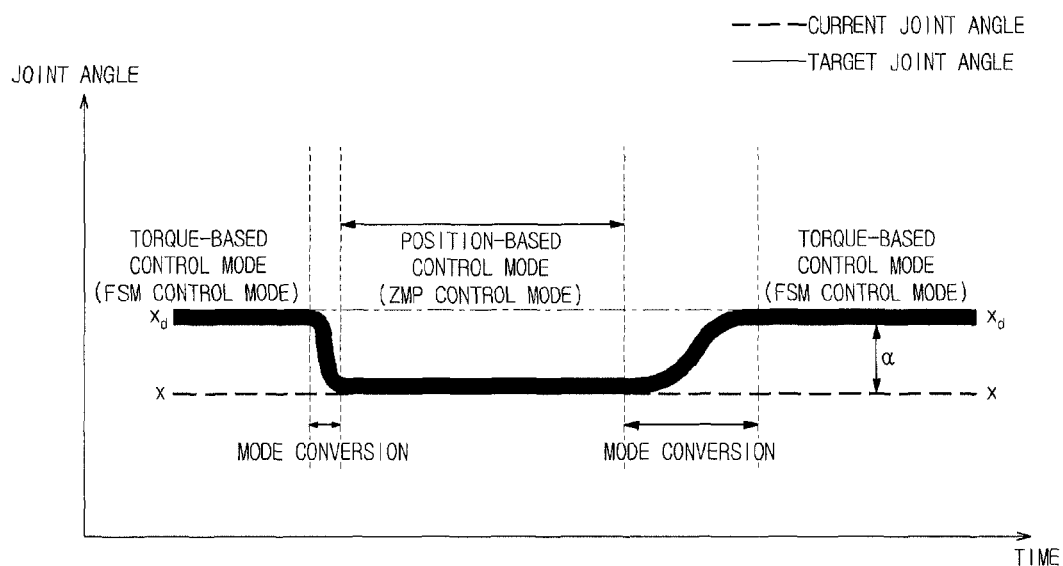
FIG. 6 is a graph illustrating a method of calculating a designed value α added to a current joint angle in the ZMP control mode during conversion from the ZMP control mode to the FSM control mode.

FIG. 5 is a view illustrating a mode conversion method between the FSM control mode and the ZMP control mode of the walking robot in accordance with an embodiment, and FIG. 6 is a graph illustrating a method of calculating the designated value α added to the current joint angle in the ZMP control mode during conversion from the ZMP control mode to the FSM control mode.

During conversion from the ZMP control mode to the FSM control mode, when the current joint angle of the ZMP control mode is substituted with the target joint angle in the FSM control mode, as described above, joint sagging may occur.

Therefore, the angle, obtained by adding the specific value α to the current joint angle in the ZMP control mode, is set as the target joint angle in the FSM control mode. In order to set the angle, obtained by adding the specific value α to the current joint angle in the ZMP control mode, as the target joint angle in the FSM control mode, a target joint angle at the last pose of the robot during conversion from the FSM control mode to the ZMP control mode is used.

In more detail with reference to FIG. 6, if, in the FSM control mode, the target joint angle is referred to as $x_d$ and the current joint angle is referred to as x, the FSM control mode has a relatively low stiffness and an error as much as $x_d$–x is generated. That is, the current joint angle differs from the target joint angle by a difference of $x_d$–x. Then, when the FSM control mode is converted to the ZMP control mode, the current joint angle in the FSM control mode is substituted with the target joint angle in the ZMP control mode. Since the ZMP control mode has a relatively high stiffness, although the current joint angle in the FSM control mode is set as the target joint angle in the ZMP control mode, joint sagging does not occur.

The walking database 314 stores a target joint angle $X_{LD}$ of each joint at the last pose in the FSM control mode during conversion from the FSM control mode to the ZMP control mode.

Thereafter, when the ZMP control mode is converted to the FSM control mode, the target joint angle $X_{LD}$ at the last pose in the FSM control mode during previous conversion from the FSM control mode to the ZMP control mode, stored in the walking database 314, is substituted with the target joint angle $x_d$ in the FSM control mode. As shown in FIG. 6, when the target joint angle is set according to the above-described method, the actual joint angle is maintained as being expressed in a dotted line, and thus it is understood that joint sagging due to mode conversion does not occur.

That is, in order to prevent hardware damage due to joint sagging during conversion from the ZMP control mode to the FSM control mode, the current joint angle in the ZMP control mode is not substituted for the target joint angle in the FSM control mode, but an angle, obtained by adding the specific value α to the current joint angle in the ZMP control mode, is set as the target joint angle in the FSM control mode. The angle obtained by adding the specific value α to the current joint angle in the ZMP control mode is equal to the target joint angle at the last pose in the FSM control mode during previous conversion from the FSM control mode to the ZMP control mode, stored in the walking database 314. Here, the value α is an index representing a stiffness difference between the ZMP control mode and the FSM control mode. Therefore, if the target joint angle at the last pose in the FSM control mode during previous conversion from the FSM control mode to the ZMP control mode, stored in the walking database 314, is used during conversion from the ZMP control mode to the FSM control mode, the stiffness difference between the FSM control mode and the ZMP control mode may be compensated for.

With reference to FIG. 6, it is understood that the joint angle in the FSM control mode and the joint angle in the ZMP control mode are uniform. The uniform joint angle means a static state. In accordance with an embodiment, during conversion between the FSM control mode and the ZMP control mode, the robot 100 is temporarily stopped and maintains a static state. That is, the robot 100 is temporarily stopped during conversion from the FSM control mode to the ZMP control mode and is temporarily stopped during conversion from the ZMP control mode to the FSM control mode. Further, these temporarily stopped states of the robot 100 are equal or have little difference. Therefore, in accordance with an embodiment, the robot 100 stops in the same state during conversion between the ZMP control mode and the FSM control mode, and performs control mode conversion in this state.

FIG. 7 is a flow chart illustrating a mode conversion method of a walking robot in accordance with an embodiment.

In the embodiment of FIG. 7, a robot is controlled in FSM control mode to perform a designed motion (operation 400).

The robot 100 operating in the FSM control mode performs conversion to the ZMP control mode if such conversion is necessary (operation 410).

The robot 100 stores a target joint angle $X_{LD}$ at the last pose in the FSM control mode during conversion from the FSM control mode to the ZMP control mode (operation 420).

The robot 100 operating in the ZMP control mode judges whether or not the conversion to the FSM control mode is necessary, and converts the ZMP control mode to the FSM control mode, if it is judged that the conversion from the ZMP control mode to the FSM control mode is necessary. Here, the target joint angle $X_{LD}$ at the stored last pose in the FSM control mode is substituted with the target joint angle in the FSM control mode. Thereafter, the FSM control mode is performed based on the set target joint angle (operation 430, operation 440, and operation 450).

As is apparent from the above description, a walking robot and a control method thereof in accordance with an embodiment prevent hardware damage or joint sagging during conversion between a position-based control mode and a torque-based control mode having different stiffnesses, thereby achieving safe walking of the robot.

The embodiments can be implemented in computing hardware and/or software, such as (in a non-limiting example) any computer that can store, retrieve, process and/or output data and/or communicate with other computers. For example, the control unit 300 in FIG. 3 may include a computer to perform calculations and/or operations described herein. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a walking robot, which enables conversion between a Finite State Machine (FSM) control mode and a Zero Moment Point (ZMP) control mode, the control method comprising:
   storing last target joint angles of the robot being controlled in the FSM control mode, during conversion from the FSM control mode to the ZMP control mode;
   after converting from the FSM control mode to the ZMP control mode, controlling the robot in the ZMP control mode; and
   after controlling the robot in the ZMP control mode, converting to the FSM control mode by substituting the stored last target joint angles for target joint angles, and then performing control of the robot in the FSM control mode based on the stored last target joint angles having been substituted for the target joint angles.

2. The control method according to claim 1, wherein a temporarily stopped state of the robot during conversion from the FSM control mode to the ZMP control mode is equal to a temporarily stopped state of the robot during conversion from the ZMP control mode to the FSM control mode.

3. The control method according to claim 1, wherein
   said conversion from the FSM control mode to the ZMP control mode includes substituting current joint angles in the FSM control mode for target joint angles in the ZMP control mode, and
   said controlling the robot in the ZMP control mode includes controlling the robot to perform a walking motion in the ZMP control mode based on the current joint angles having been substituted for the target joint angles.

4. The control method according to claim 1, wherein said storing includes storing target joint angles at a last pose of the robot during the conversion from the FSM control mode to the ZMP control mode.

5. The control method according to claim 1, wherein the conversion from the FSM control mode to the ZMP control mode is carried out when a motion of the robot requiring precise position control is performed, and the conversion from the ZMP control mode to the FSM control mode is carried out when a motion of the robot requiring simple control is performed.

6. The control method according to claim 1, wherein in the ZMP control mode, voltages input to joint motors are calculated using angle data of respective joints and a PID control equation, and are then applied to the joint motors to drive the joint motors.

7. The control method according to claim 1, wherein in the FSM control mode, torques are calculated using angle data of respective joints and a PID control equation, and voltages applied to joint motors are calculated using the torques and are then applied to the joint motors to drive the joint motors.

8. A walking robot comprising:
   a sensor unit to measure angles and torques of joints of the walking robot; and
   a control unit to
      calculate voltages applied in a Finite State Machine (FSM) control mode and a Zero Moment Point (ZMP) control mode according to the measured angles and torques of the joints to drive respective joint motors of the walking robot,
      store last target joint angles of the walking robot being controlled in the FSM control mode, during conversion from the FSM control mode to the ZMP control mode, and
      after controlling the robot in the ZMP control mode, convert to the FSM control mode by substituting the stored last target joint angles for target joint angles, and then perform control of the walking robot in the FSM control mode based on the stored last target joint angles having been substituted for the target joint angles.

9. The walking robot according to claim 8, wherein the control unit temporarily stops the walking robot during conversion between the FSM control mode and the ZMP control mode.

10. The walking robot according to claim 8, wherein the control unit substitutes current joint angles in the FSM control mode with target joint angles in the ZMP control mode during conversion from the FSM control mode to the ZMP control mode.

11. The walking robot according to claim 8, wherein the last target joint angles in the FSM control mode are target joint angles in the FSM control mode at a point of time when the FSM control mode is converted to the ZMP control mode.

12. The walking robot according to claim 8, wherein the control unit carries out the conversion from the FSM control mode to the ZMP control mode when a motion requiring precise position control of the walking robot is performed, and carries out the conversion from the ZMP control mode to the FSM control mode when a motion requiring simple control of the walking robot is performed.

13. The walking robot according to claim 8, wherein the control unit includes a mode switching unit to perform a switching motion between the ZMP control mode and the FSM control mode based on a current control mode of the walking robot, an external command, and a target motion.

14. The walking robot according to claim 13, wherein the control unit further includes an FSM-ZMP conversion unit and a ZMP-FSM conversion unit, activated according to switching of the mode switching unit.

15. The walking robot according to claim 8, wherein the control unit includes a database to store the last target joint angles.

* * * * *